(12) United States Patent
Heinemann et al.

(10) Patent No.: US 6,992,898 B2
(45) Date of Patent: Jan. 31, 2006

(54) SMART-CARD MODULE WITH AN ANISOTROPICALLY CONDUCTIVE SUBSTRATE FILM

(75) Inventors: Erik Heinemann, Regensburg (DE); Frank Püschner, Kehlheim (DE); Detlef Houdeau, Langquaid (DE)

(73) Assignee: Infineon Technologies AG, Munich (DE)

( * ) Notice: Subject to any disclaimer, the term of this patent is extended or adjusted under 35 U.S.C. 154(b) by 0 days.

(21) Appl. No.: 10/160,629

(22) Filed: Jun. 3, 2002

(65) Prior Publication Data

US 2002/0172018 A1 Nov. 21, 2002

Related U.S. Application Data

(63) Continuation of application No. PCT/DE00/04282, filed on Dec. 1, 2000.

(30) Foreign Application Priority Data

Dec. 2, 1999 (EP) .................................. 99124141

(51) Int. Cl.
 H05K 7/02 (2006.01)
 H05K 3/30 (2006.01)
 H05K 1/02 (2006.01)
(52) U.S. Cl. ...................... 361/760; 361/737; 361/748; 361/749; 361/767; 361/808; 257/678; 174/255; 174/260; 174/250
(58) Field of Classification Search ................ 361/736, 361/737, 748–751, 760, 764, 765, 767, 779, 361/783, 793, 808; 174/250, 260, 254–257; 257/678–679
See application file for complete search history.

(56) References Cited

U.S. PATENT DOCUMENTS

| 4,719,140 | A | | 1/1988 | Hara et al. |
| 5,546,279 | A | * | 8/1996 | Aota et al. ................... 361/749 |
| 5,705,852 | A | * | 1/1998 | Orihara et al. .............. 257/679 |
| 5,936,847 | A | | 8/1999 | Kazle |
| 6,137,687 | A | * | 10/2000 | Shirai et al. ................. 361/749 |
| 6,146,753 | A | * | 11/2000 | Niimi et al. ................. 428/332 |
| 6,160,526 | A | * | 12/2000 | Hirai et al. .................. 343/895 |
| 6,207,473 | B1 | * | 3/2001 | Hirai et al. .................. 438/160 |
| 6,319,594 | B1 | * | 11/2001 | Suzuki et al. ............... 428/208 |
| 6,404,644 | B1 | * | 6/2002 | Ikefuji et al. ............... 361/737 |
| 6,503,627 | B1 | * | 1/2003 | Niimi et al. ................. 428/409 |
| 2001/0015286 | A1 | * | 8/2001 | Shibata et al. .............. 174/260 |

FOREIGN PATENT DOCUMENTS

| DE | 35 35 791 A1 | 5/1966 |
| DE | 196 32 113 C1 | 2/1998 |
| EP | 0 766 197 A1 | 4/1997 |
| EP | 0 908 844 A1 | 4/1999 |
| JP | 9-148 378 | 6/1997 |

* cited by examiner

Primary Examiner—Kamand Cuneo
Assistant Examiner—Dameon E. Levi
(74) Attorney, Agent, or Firm—Laurence A. Greenberg; Werner H. Stemer; Ralph E. Locher

(57) ABSTRACT

A smart-card module is described which has a substrate film of an anisotropically conductive material and at least one semiconductor chip. The semiconductor chip has connection points. On one surface of the semiconductor film, contact areas are applied directly. The substrate film is disposed between the semiconductor chip and the contact areas in such a way that it connects the connection points of the semiconductor chip to the contact areas in a manner of a direct contact.

7 Claims, 1 Drawing Sheet

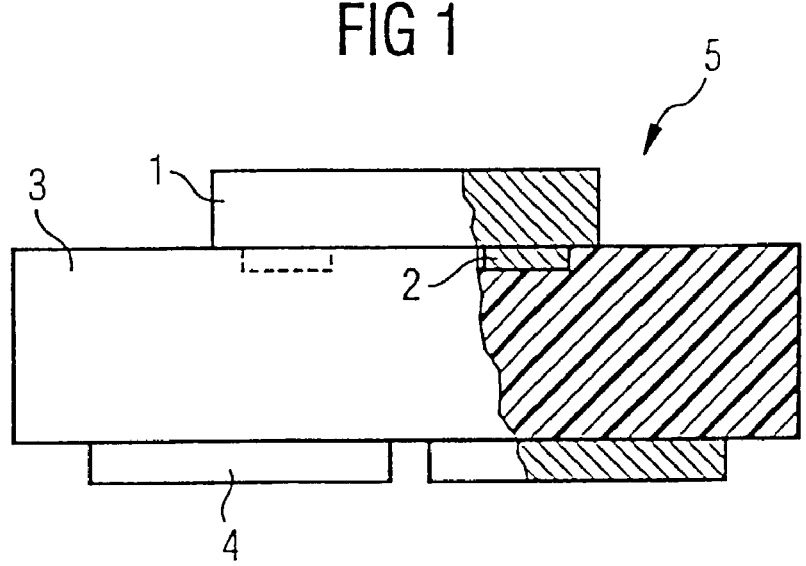
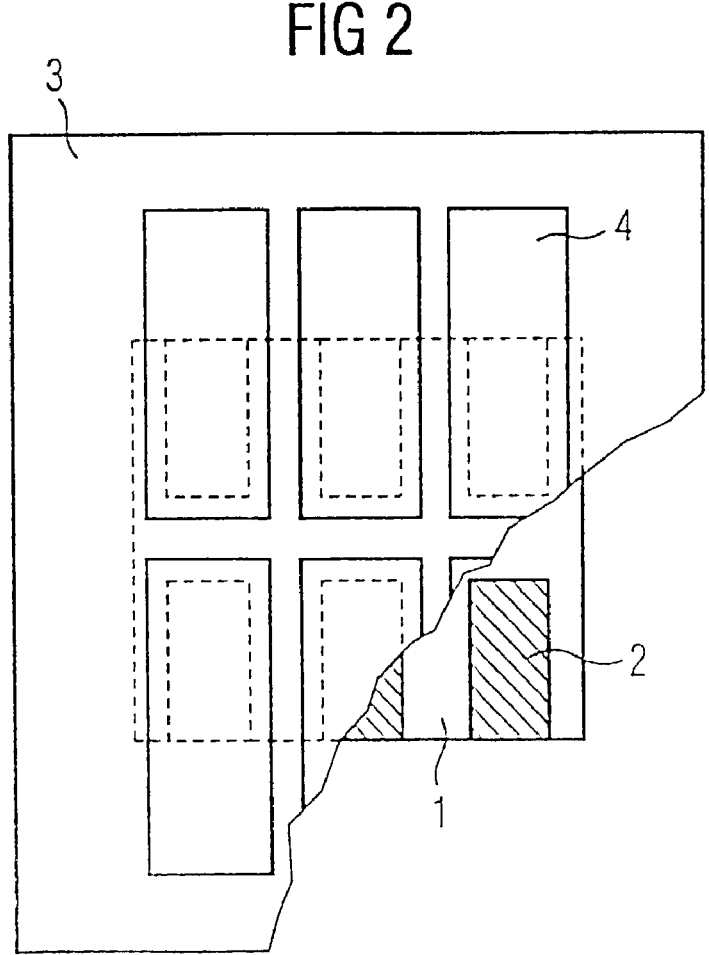

SMART-CARD MODULE WITH AN ANISOTROPICALLY CONDUCTIVE SUBSTRATE FILM

CROSS-REFERENCE TO RELATED APPLICATION

This application is a continuation of copending International Application No. PCT/DE00/04282, filed Dec. 1, 2000, which designated the United States and was not published in English.

BACKGROUND OF THE INVENTION

Field of the Invention

The invention relates to a smart-card module with an anisotropically conductive substrate film. Such smart-card modules are manufactured during the production of smart cards as intermediate products which are independent of the fabrication technology, as disclosed by Published, German Patent Application DE 196 32 113 A.

A conventional smart-card module, as used in known telephone cards, in this case contain a substrate and at least one semiconductor circuit, a semiconductor chip, as it is known, which is disposed on the substrate. Furthermore, the substrate has contact areas. In terms of their size, the contact areas are standardized in accordance with the ISO standard.

It is often the case that conductor tracks are additionally provided on one side of the substrate, serving as feed lines to the contact areas. Since the semiconductor chip and the contact areas are located on different sides of the substrate, through contacts are also necessary, which permit an electrical connection from one side of the substrate to the other.

The electrical connection on the side of the semiconductor chip is provided via contact points, pads as they are known, which are located on the surface of the semiconductor chip.

A smart-card module that is usual nowadays has a substrate made of a film material, which is provided on one side with a metal film and from which the contact areas are formed by structuring.

For the mechanical fixing of the semiconductor chip on the substrate and for the electrical connection of the semiconductor chip to the contact areas, a number of methods are available.

In the case of the aforementioned telephone card, as a rule the "wire bond" technique is applied. Here, the semiconductor chip is fixed to the substrate in such a way that the connection points face away from the substrate surface. The connection points are then electrically conductively connected to the contact areas by thin wires.

In the "tape automated bonding" (TAB) technique, the semiconductor chip is soldered directly to the conductor track system provided on the substrate. This requires suitable metallization of the connection points in advance. As a result of the soldering, the semiconductor chip is also fixed mechanically, so that actual fixing of the chip is dispensed with.

Furthermore, Japanese Patent Abstract JP 09148378 A discloses implementing a connection between the semiconductor chip and the conductor track system by an anisotropically conductive (AC) film. In this case, the film is disposed between the substrate and the semiconductor chip. The AC film, according to the configuration described, is an adhesive film with which the semiconductor chip is fixed mechanically to the substrate.

The drawback with these techniques consists in the comparatively high costs that are caused, first, by the substrate material itself and, second, by the process steps which are necessary for the electrical connection.

In particular when connecting the semiconductor chip to the substrate by an AC film, costs arise both for the substrate with the conductor track system and for the AC film. In many applications, smart cards must not give rise to high costs since, as in the case of the telephone card, they constitute a disposable product with an extremely short lifetime.

SUMMARY OF THE INVENTION

It is accordingly an object of the invention to provide a smart-card module with an anisotropically conductive substrate film which overcomes the above-mentioned disadvantages of the prior art devices of this general type, which is a cost-effective smart-card module with the least possible expenditure.

With the foregoing and other objects in view there is provided, in accordance with the invention, a smart-card module. The smart-card module includes a substrate film formed of an anisotropically conductive material and has a surface, at least one semiconductor chip having connection points disposed on the substrate film, and contact areas applied directly to the surface of the substrate film. The substrate film is disposed between the semiconductor chip and the contact areas in such a way that the substrate film connects the connection points of the semiconductor chip to the contact areas in a manner of a direct contact.

According to the invention, in this case the substrate film used is an AC film, on whose one side the contact areas are applied directly and on whose other side the semiconductor chip is fixed. The AC film is used both as a mechanical substrate for the smart-card module and as an electrical connecting element between the semiconductor chip and the contact areas. The separate substrate and process steps for the electrical connection and for making through contact are therefore dispensed with, so that smart-card modules according to the invention can be produced considerably more cost-effectively.

In an advantageous refinement of the invention, the contact areas are vapor-deposited directly onto the AC film. The method of producing contact areas is particularly cost-effective as compared with a substrate provided with a continuous metal laminate, on which contact areas and conductor tracks are formed by structuring the metal laminate.

In a further preferred embodiment of the invention, provision is made for the AC film to be a hot-melt adhesive film. This brings with it the advantage that the film simultaneously ensures the mechanical fixing of the semiconductor chip, so that additional fixing steps are dispensed with.

Furthermore, it is advantageous to dimension the areas of the connection points to be enlarged in such a way that they cover virtually the entire area of the side of the semiconductor chip facing the AC film. This has the effect of a particularly reliable provision of contact between the semiconductor chip and the AC film, so that the requirement on the AC film with regard to its conductivity, and therefore the production costs for the AC film, are reduced and the fabrication yield of the chip modules is increased.

A further advantage of the invention consists in the possibility of producing a very thin module, which is very flexible with regard to flexible stress.

Other features which are considered as characteristic for the invention are set forth in the appended claims.

Although the invention is illustrated and described herein as embodied in a smart-card module with an anisotropically conductive substrate film, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 1 is a diagrammatic, side-elevational view, partially cut-away, of a smart-card module according to the invention; and FIG. 2 is a plan view, partially cut-away, of the smart-card module on the side of contact areas.

DESCRIPTION OF THE PREFERRED EMBODIMENTS

Referring now to the figures of the drawing in detail and first, particularly, to FIG. 1 thereof, there is shown a schematic illustration of a smart-card module 5. The module 5 contains a substrate 3, which is formed from a film-like material. For this material, an anisotropically conductive hot-melt adhesive film is selected, whose direction of maximum conductivity is perpendicular to a plane of the film.

Fitted to one side of the substrate 3 is a semiconductor chip 1, which has connection points 2 on one side face. The semiconductor chip 1 is disposed such that its connection points 2 are in direct contact with the substrate 3.

For the purpose of mechanical fixing, the semiconductor chip 1 is adhesively bonded to the substrate 3, the hot-melt adhesive film itself acting as the adhesive, on account of its adhesive property.

On the other side of the substrate 3, metallic ISO contact areas 4 are vapor-deposited. The electrical connection between the ISO contact areas 4 and the connection points 2 of the semiconductor chip 1 is produced by the substrate 3 itself. The direction of the connection in this case always runs perpendicular to the plane of the film, while parallel to the plane of the film, the substrate 3 represents an insulator.

FIG. 2 shows a particularly advantageous embodiment of the invention. In this case, the connection points 2 are configured with an enlarged cross-sectional area, so that they cover a substantial part of the chip surface. Because of the large cross-sectional area, the provision of a particularly good contact between the connection points 2 and the substrate or carrier 3 is ensured. Furthermore, as a result of the enlarged contact areas, the requirements on the positioning accuracy when fitting the semiconductor chip 1 to the substrate 3 are advantageously reduced.

We claim:

1. A smart-card module, consisting of:
   a substrate film formed of an anisotropically conductive material and having a surface,
   at least one semiconductor chip having connection points and disposed on the substrate film, and
   contact areas applied directly to the surface of the substrate film, the substrate film disposed between the semiconductor chip and the contact areas causing said substrate film to electrically connect the connection points of the semiconductor chip to the contact areas by means in a manner of direct contact and to mechanically support the at least one semiconductor chip.

2. The smart-card module according to claim 1, wherein said contact areas are vapor-deposited onto said surface of said substrate film.

3. The smart-card module according to claim 1, wherein said substrate film is formed from a hot-melt adhesive film.

4. The smart-card module according to claim 1, wherein said connection points in combination cover a predominant part of one side of said semiconductor chip.

5. The smart-card module according to claim 1, wherein said substrate film is a single substrate film electrically connecting said connection points and said contact areas, and mechanically supporting said semiconductor chip.

6. The smart-card module according to claim 5, wherein said substrate film electrically connects said connection points and said contact areas in a first direction relative to a plane of said substrate and is an insulator in a second direction different from the first direction relative to the plane of said substrate.

7. The smart-card module according to claim 1, wherein said substrate film electrically connects said connection points and said contact areas in a first direction relative to a plane of said substrate film and is an insulator in a second direction different from the first direction relative to the plane of said substrate film.

* * * * *